United States Patent [19]
Davey et al.

[11] Patent Number: 5,258,981
[45] Date of Patent: Nov. 2, 1993

[54] METHOD OF OPERATING A COMMUNICATIONS SYSTEM, A COMMUNICATIONS SYSTEM AND A SECONDARY STATION FOR USE IN THE SYSTEM

[75] Inventors: Mark P. Davey, Crawley; Christopher D. Pudney, Newbury, both of England

[73] Assignee: U.S. Philips Corporation, New York, N.Y.

[21] Appl. No.: 789,726

[22] Filed: Nov. 8, 1991

[30] Foreign Application Priority Data

Nov. 14, 1990 [GB] United Kingdom ................ 9024711

[51] Int. Cl.⁵ .............................................. H04J 3/16
[52] U.S. Cl. ...................................... 370/95.1; 370/29
[58] Field of Search ............... 370/49.1, 95.3, 100.1, 370/104.1, 110.1, 24, 29, 31, 26; 340/825.44, 825.1; 455/33.1–33.4, 58.1, 51.6, 32.1; 379/59, 60, 61, 63

[56] References Cited

U.S. PATENT DOCUMENTS

| | | | |
|---|---|---|---|
| 4,799,219 | 1/1989 | Calvignac et al. | 370/94.1 |
| 4,914,649 | 4/1990 | Schwendeman et al. | 370/95.1 |
| 5,014,314 | 5/1991 | Mulford et al. | 370/95.1 |
| 5,042,082 | 8/1991 | Dahlin | 370/95.1 |
| 5,088,094 | 2/1992 | Grauel et al. | 370/95.1 |
| 5,095,480 | 3/1992 | Fenner | 370/95.1 |
| 5,117,423 | 5/1992 | Shepherd et al. | 370/95.1 |
| 5,150,362 | 9/1992 | Akerberg | 370/95.1 |

Primary Examiner—Douglas W. Olms
Assistant Examiner—Dang Ton
Attorney, Agent, or Firm—Leroy Eason

[57] ABSTRACT

In a cellular communication system an out-of-lock secondary station scans the physical channels of each of the respective carrier channels in order to find a carrier channel onto which to lock. In order to expedite such scanning, the secondary station follows a scanning sequence such that each scan is of consecutive physical channels of one of a series of non-adjacent carrier channels. Due to spill-over of transmitted beacon signals which may be present in the non-scanned adjoining carrier channels, it is possible during each scan to detect the presence of beacon signals in an adjoining non-scanned carrier channel as well as in the scanned channel. This achieves more rapid identification of an available physical channel in a carrier channel selected by the secondary station, thereby reducing the time to establish lock-on and so saving battery power. During each scan the secondary station may also monitor the signal strength in the respective physical channels for only a fraction of the duration of each channel, thereby reducing the time to select an available carrier channel having the best transmission characteristics.

8 Claims, 6 Drawing Sheets

METHOD OF OPERATING A COMMUNICATIONS SYSTEM, A COMMUNICATIONS SYSTEM AND A SECONDARY STATION FOR USE IN THE SYSTEM

BACKGROUND OF THE INVENTION

1. Field of the Invention

The present invention relates to a method of operating a cellular communications system in which secondary stations are able to roam in and out of the radio coverage area (or "cell") of one or more fixedly sited primary stations, such stations regularly transmitting idle beacon signals which are detectable by in range secondary stations.

The invention also relates to such a communications system and to a secondary station for use therein.

2. Description of the Related Art

For convenience of description the present invention will be described with reference to DECT (Digital European Cordless Telecommunications) system which comprises a plurality of time division duplex frequency channels which are accessed using a time division multiple access (TDMA) protocol. More particularly DECT comprises, for voice communication, one or more geographically separated primary or fixed base stations each having radio transceiving means defining a cell and a land line connection to the public service telephone network (PSTN), and one or more secondary or transportable, for example hand portable, stations having radio transceiving means which are able to communicate by way of a radio link with an in-range base station. The European Telecommunications Standards Institute (ETSI) currently proposes that DECT shall have ten radio carrier channels but this number may be increased later if there is sufficient demand. Each radio channel is at a particular carrier frequency, and is divided into time frames of 10 milliseconds duration. Each frame is divided into 24 equal time slots (or physical channels) which are paired to establish 12 time division duplex (TDD) channels termed duplex voice channels. The TDD arrangement is such that the nth and the (n+12)th time slots, where n is an integer between 1 and 12, are the forward and reverse physical channels constituting a complete duplex voice channel. Each such pair of physical channels is capable of carrying one duplex digitised speech conversation, or data at a rate of 32 kbits/sec. As the framing structure of all of the radio carrier channels is synchronised, this means that the correspondingly numbered physical channels in each of the radio carrier channels coincide in time.

In setting up a voice call between a primary and a secondary station, a duplex voice channel is assigned to the transaction. The assignment of the duplex voice channel in any of the radio carrier channels is by the method of dynamic channel allocation whereby a secondary station, taking into account its radio environment as determined by monitoring the average interference in each of the 120 pairs of physical channels, negotiates with the primary station for access to the best duplex voice channel currently available under the control of the primary station.

Currently the DECT specification requires base stations to continue transmissions on their last active forward physical channel to provide the system functions of broadcasting the basic system information, base station identity, and a frequency and frame timing reference. For convenience of description such transmissions will be called "normal idle beacon" transmissions.

A secondary station, once locked to a primary station, remains in synchronism with the framing structure of the primary station but can be powered down or "sleep" for relatively long periods. However the secondary station is awakened for the occurrence of the primary station's active forward physical channel in one frame (10 mS) in every 16 frames (or 160 mS) in order to be capable of receiving any paging transmissions addressed to it. This constitutes one out of every $16 \times 24 = 384$ physical channels. By having such an arrangement for the reception of possible paging signals, the secondary station therefore has a duty cycle of the order of 1 in 384, which is effective in reducing the power consumption. However since the secondary station need be active for only a portion of the physical channel in order to receive any paging message, a duty cycle of 1 to 2000 can be achieved with this arrangement.

In the case of a secondary station which is out-of-lock, it wakes up approximately every 200 seconds and tries to detect a system onto which it can lock by scanning all the carrier channels in succession, each carrier channel being monitored for the duration of one frame which in the case of 10 carrier channels will take 100 mS. Such a search of the carrier channels not only upsets the duty cycle of the secondary station, which if there are no paging messages is of the order of 1 in 2000 for a locked secondary station, but also reduces its battery life.

An object of the present invention is to make scanning of the carrier channels more efficient.

According to one aspect of the present invention there is provided a method of operating a cellular radio communications system which comprises a primary station and a plurality of secondary stations, communication between the primary and secondary stations being in accordance with a time division multiplex protocol in which each of a plurality of carrier channels is divided into time frames and each frame is divided into a plurality of physical channels, and wherein an out-of-lock secondary station is powered up to periodically scan the physical channels in each carrier channel in order to detect those physical channels in which transmissions are taking place. The method is characterised in that the scanning sequence of the secondary station is controlled so that during any one scan of the sequence consecutive physical channels which are located in one of a series of non-adjacent carrier channels are scanned.

According to a second aspect of the invention there is provided a cellular radio communications system comprising a primary station and a plurality of secondary stations, communication between the primary and secondary stations being in accordance with a time division multiplex protocol in which each of a plurality of carrier channels is divided into time frames and each frame is divided into a plurality of physical channels and, wherein an out-of lock secondary station is powered up to periodically scan the physical channels in each carrier channel in order to detect those physical channels in which transmissions are taking place. The system is characterised in that the secondary station comprises control means for controlling the scanning sequence so that during any one scan of the sequence consecutive physical channels which are located in one of a series non-adjacent carrier channels are scanned.

According to a third aspect of the invention there is provided a secondary station for use in the aforesaid system, comprising transmitting and receiving means and control means for controlling the transmitting and receiving means. The control means is responsive to the secondary station being out-of-lock to initiate scanning of all the available physical channels in the respective carrier channels. The scanning sequence is controlled so that during any one scan of the sequence consecutive physical channels which are located in one of a series of non-adjacent carrier channels are scanned.

The invention is based on the fact that the characteristics of a transmitted signal enable its presence in an adjacent carrier channel to be determined when carrying out an earlier scanning sequence. As a result, a channel scanning protocol can be devised which enables some but not all the carrier channels to be scanned at any one time to thereby obtain a good indication of the presence of a transmitting primary station not only in the carrier channels being scanned but also in the carrier channels adjacent to those being scanned.

The respective scanning sequences may be all the odd numbered carrier channels and then all the even numbered carrier channels.

These sequences may be further subdivided into four scan sequences comprising, respectively, the forward transmissions in the odd numbered carrier channels, the forward transmissions in the even numbered carrier channels, the reverse transmissions in the odd numbered channels and the reverse transmissions in the even numbered channels. Other variations are also possible.

In one embodiment each scanned physical channel is examined for substantially its whole duration. However an alternative method is to monitor the signal strength for only a fraction, for example one eighth, of the period of each physical channel. Such a fraction may be say 50 μs out of 416 μs. However care must be taken to ensure that said fraction does not occur during a guard space.

In a development of the system, each primary station transmits a system identity code which may be used by a secondary station to obtain information about its neighbouring systems, which information is stored. When an out of range secondary station detects a neighbouring system, it can therefore anticipate that it is approaching its own local system and as a consequence it may increase its frequency of scan so that it is able to initiate a call within the guaranteed maximum connection time of 1.5 seconds specified by most telephone authorities.

BRIEF DESCRIPTION OF THE DRAWINGS

The present invention will now be described, by way of example, with reference to the accompanying drawings, wherein.

DESCRIPTION OF THE PREFERRED EMBODIMENTS

Figure 1:
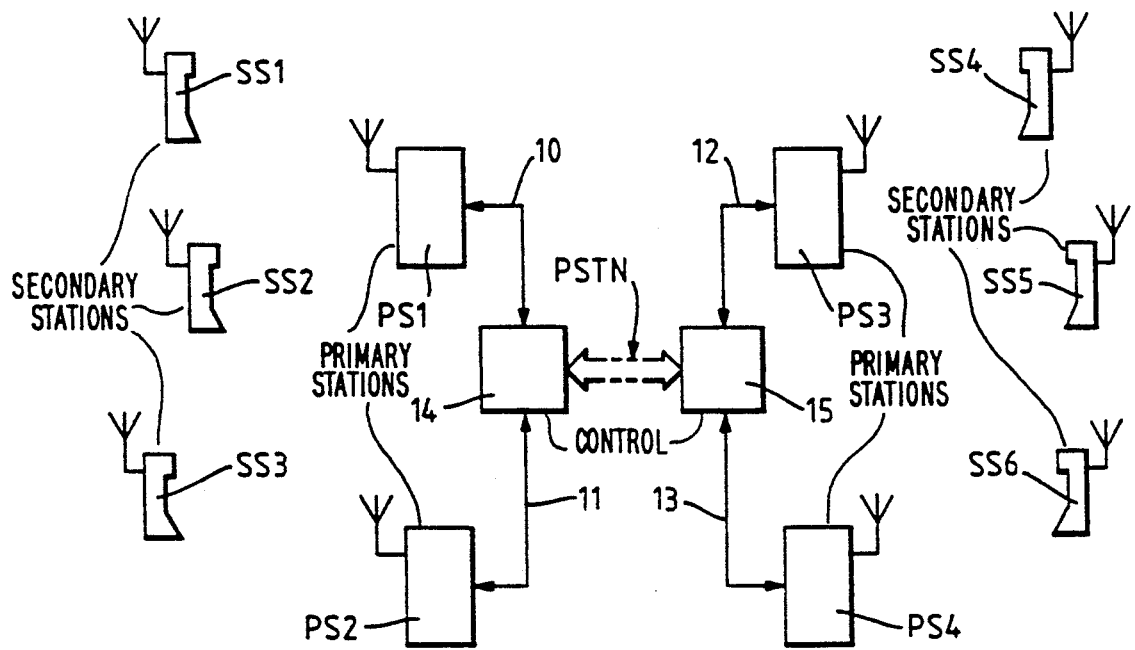
FIG. 1, illustrates diagrammatically a digital cordless cellular telephone communication system, FIG, 2 is a diagram showing the DECT frame structure imposed on ten carrier channels.

The digital cordless cellular telephone communication system shown in FIG. 1 comprises a plurality of primary or fixed base stations PS of which four, PS1, PS2, PS3 and PS4, are shown. Each of the primary stations is connected by way of a respective wideband landline link 10, 11, 12 and 13, capable of carrying digitised speech or data at a rate of say 1.152 Mbits/sec. to cordless telephone system controllers 14 and 15. The system controllers 14 and 15 are, in the illustrated embodiment, connected to the PSTN.

The system further comprises a large plurality of transportable, for example hand portable, secondary stations SS1 to SS6 which in the illustrated embodiment are used for digital time division duplex speech communication. Duplex communication between the secondary stations within an area covered by a system controller and/or the PSTN is by way of radio through the primary stations PS. Accordingly the primary and secondary stations each comprise a radio transmitter and receiver.

Figure 2:
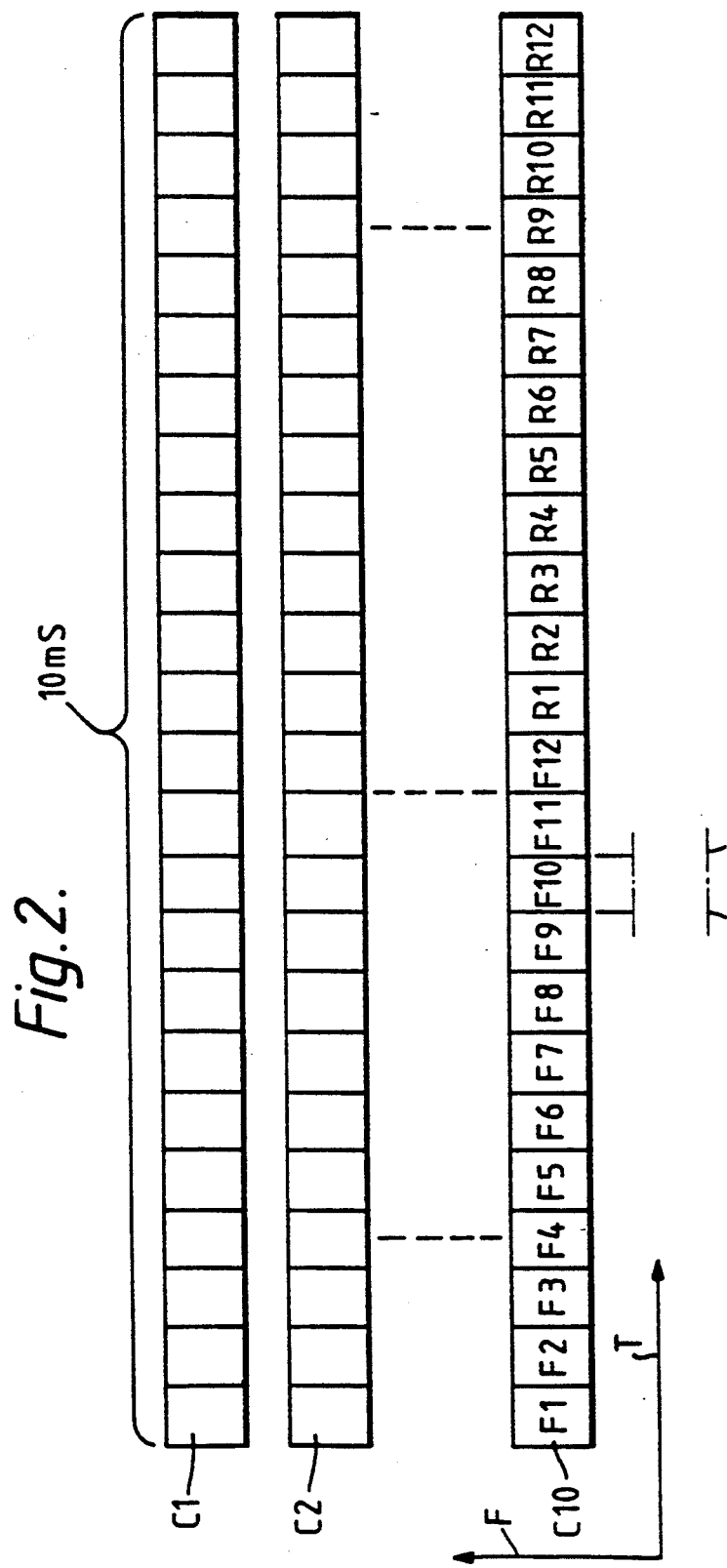

FIG. 2 shows ten carrier channels C1 to C10, each carrier channel is divided in the time domain into 10 ms frames. Each frame is divided into 24 time slots or physical channels of which the first twelve F1 to F12 are allocated for transmission in a forward direction, that is from a primary station to a secondary station, and the second twelve R1 to R12 are allocated for transmission in the reverse direction. The forward and reverse physical channels are paired, that is, the correspondingly numbered forward and reverse physical channels, for example F4, R4, comprise a pair which hereinafter will be referred to as a duplex voice channel. In DECT there are 120 duplex voice channels altogether. In setting-up a call between a primary and a secondary station, a duplex voice channel is assigned to the transaction. The assignment of the duplex voice channel in any of the carrier channels C1 to C10 is by the method of dynamic channel allocation whereby a secondary station, taking into account its radio environment, negotiates with the primary station for access to the best duplex voice channel currently available under the control of the primary station.

Figure 3:
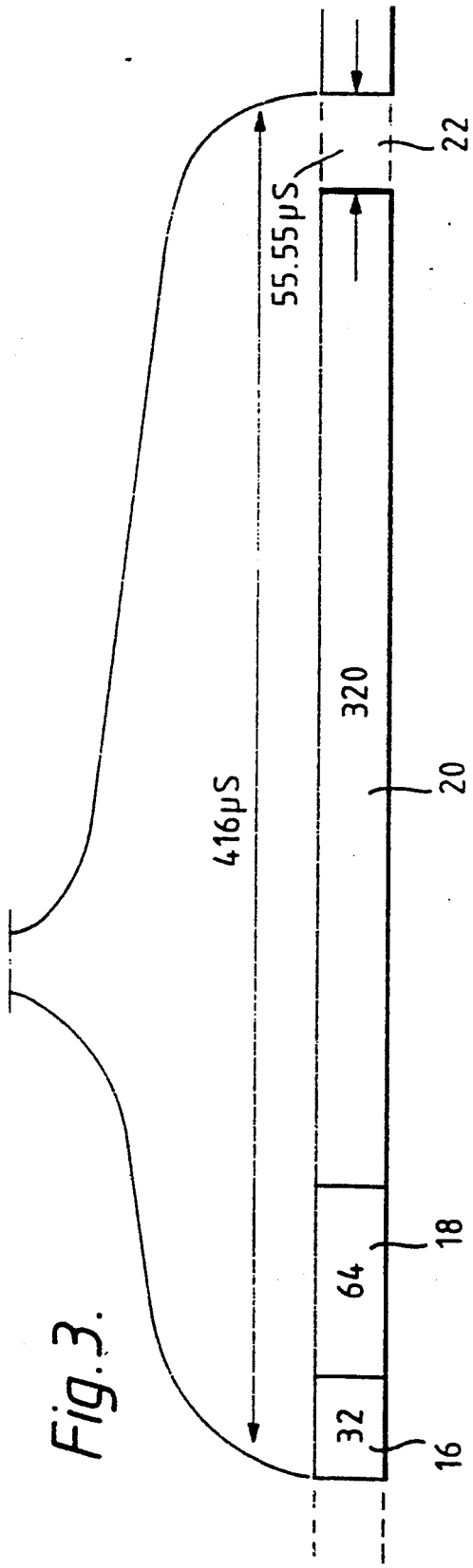
FIG. 3 is a diagram of the structure of a DECT physical channel.

The general format of a signal in a physical channel is shown in FIG. 3. The format comprises a header and a synchronisation sequence 16, signalling data 18 (which may include paging information) and digitised speech 20. An interslot guard space 22 is also provided at the end of the message. The digitisation rate is 32 kbits/sec. Both the primary and secondary stations include a buffer to compress the speech which is digitised at 32 kbits/sec. into bursts of data at 1.152 Mbits/sec, so that it is suitable for transmission.

The basic protocol for a transmission which is to be initiated by a secondary station SS, which therefore is a reverse transmission is for it to listen to all the reverse physical channels in each of the carrier channels and ascertain which reverse physical channels are busy and idle and which are the relative signal quality in these reverse physical channels. From the information so derived the secondary station determines what it believes is the best available duplex voice channel and transmits a message in the reverse physical channel of such duplex channel to a particular primary station PS.

The signalling data 18 in the message, together with other details in the initial transmission, are decoded and passed to the system controller 14 or 15 which sets-up the fixed network connection. The primary station confirms that the particular duplex voice channel has been assigned to the transaction.

In the forward direction, the primary stations send paging messages to the addressed secondary stations in one physical channel of say every sixteenth frame. Such an arrangement enables the secondary stations to "sleep" during at least the intervening fifteen frames, thereby economising on power. An addressed secondary station, in response to a paging message addressed to it will, unless a duplex voice channel has been assigned, search through all the carrier channels and transmit on the reverse physical channel of the best available duplex voice channel.

Also during idle periods the primary station is required by the DECT system specification to continue transmissions in the forward physical channel of its last active duplex voice channel in what will be termed its normal idle beacon mode. The information, transmitted includes basic system information including the base station identity and frequency and frame timing reference. Such system information is required by a secondary station when wishing to initiate a call.

An idle secondary station when not locked to a particular cordless telephone system is awakened periodically and will scan all the carrier channels by tuning to each carrier channel for the duration of a frame and determining the presence of idle beacon signals or other signals in the respective physical channels and their quality. In the case of 10 carrier channels a full scan will take 100 mS. If a duty cycle of 1 in 2000 is maintained, which is approximately that of a locked secondary station when sleeping, then a full scan is repeated once every 200 seconds. In certain situations this may be unacceptably long.

In accordance with the method of the present invention a partial scan is repeated more frequently than a single full scan, and because of the spillover of an idle beacon signal into adjacent carrier channels it is possible for the secondary station to determine the presence, albeit at a low level, of an idle beacon signal being transmitted in a physical channel of an unscanned adjacent carrier channel.

Figure 4:
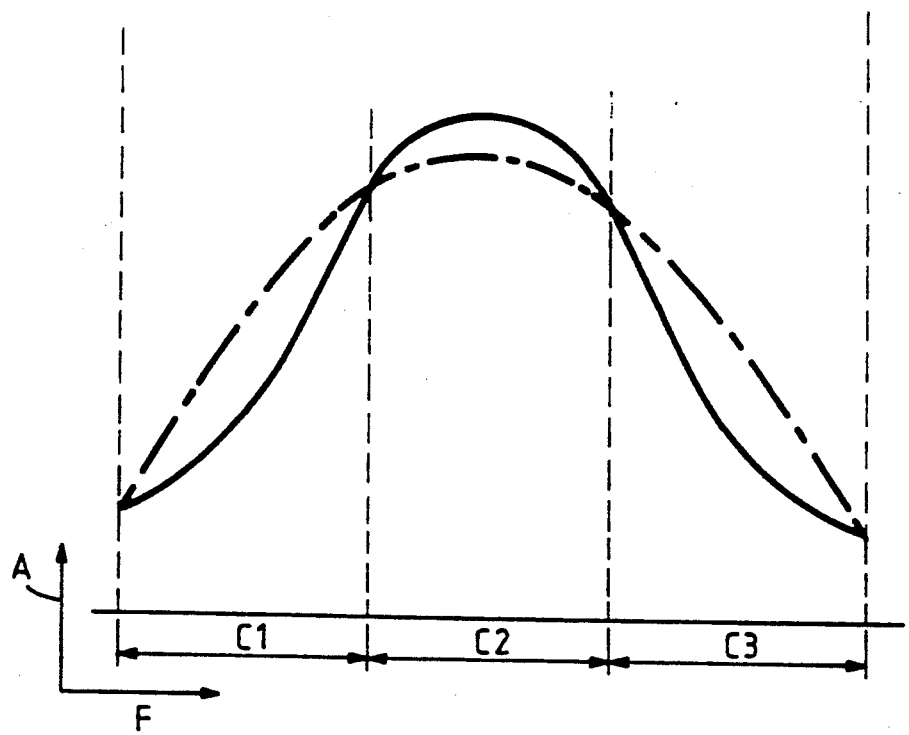
FIG. 4 shows diagrammatically the amplitude (A) versus frequency (F) bond of the transmitter output and in chain-dot lines a typical receiver filter characteristic.

FIG. 4 illustrates diagrammatically the frequency bond of a transmission in a carrier channel C2 and its spillover into the adjacent carrier channels C1, C3. The characteristic of a typical receiver filter is shown in chain-dot lines. These relaxed transmitter and receiver filter specifications enable the method in accordance with the present invention to be implemented simply. Thus a receiver listening on an adjacent carrier channel, say channel C1, does not reject completely all the signal transmitted in the adjacent carrier channel. In the DECT specification the adjacent channel attenuation has a relatively low value of the order of 28 dB. However DECT is expected to operate in an environment where the signal strength can vary by as much as 20 dB over very short distances. Hence to maintain a call, a secondary station normally requires a signal 20 dB greater than the minimum, say typically 40 dB, for adequate reception. Thus adjacent channel interference is received at about the same range as that which allows a system to be usable.

Figure 5:
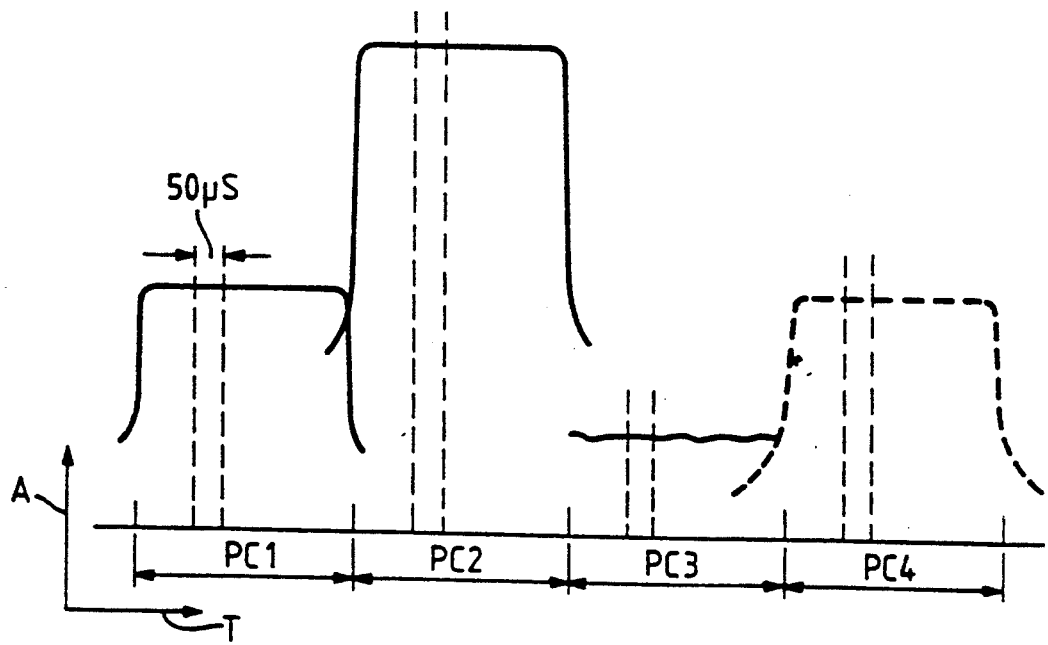
FIG. 5 is a diagram of amplitude (A) versus time (T) illustrating signals picked up in four physical channels.

FIG. 5 illustrates diagrammatically a situation in which a weal idle beacon signal is received from a distant primary station transmitting in a physical channel PC1, a strong idle beacon signal is received from a nearby primary station transmitting in a physical channel PC2, there is no signal in a physical channel PC3 and a spill over signal from an adjacent carrier channel is received in a physical channel PC4, which would otherwise have no signal in it.

Thus if an idle secondary station scans non-adjacent carrier channels, for example all the odd-numbered channels, it can build up a channel map detailing in which physical channels there is no usable channel present. Such a scan can be completed in half the time of a full scan. However since the search is less accurate than a full scan, then a second scan is made later, say 100 seconds later, of those carrier channels, for example the even-numbered channels, not covered by the previous scan. If however the secondary station has been able to lock onto a permitted system found to be acceptable in the first scan, then it does not need to execute the second scan. A saving in battery power is thus achieved.

In a first variant on the method just described, the scanning of the non-adjacent carrier channels is shortened further by say scanning only the forward physical channels in say the odd numbered carrier channels, then the forward physical channels in the even numbered carrier channels, then the reverse physical channels in the odd numbered carrier channels and finally the reverse physical channels in the even numbered carrier channels. There is a delay of say 50 seconds between successive scans in the scanning sequence.

In a second variant of the methods described, instead of a secondary station monitoring the physical channels for substantially their entire duration of 416 $\mu$S, a received signal strength indication is taken over a fraction, say 50 $\mu$S, of the duration of a physical channel. Such sampling of the physical channels is shown diagrammatically in broken lines in FIG. 5. The length of the sampling period has to be such as to guarantee that it will not take place in the guard space 22 (FIG. 3) due to the fact that the idle secondary station is not synchronised with the framing structure of the primary stations. In a modification of this method there could be 2 or more shorter sampling periods per physical channel.

Figure 6:
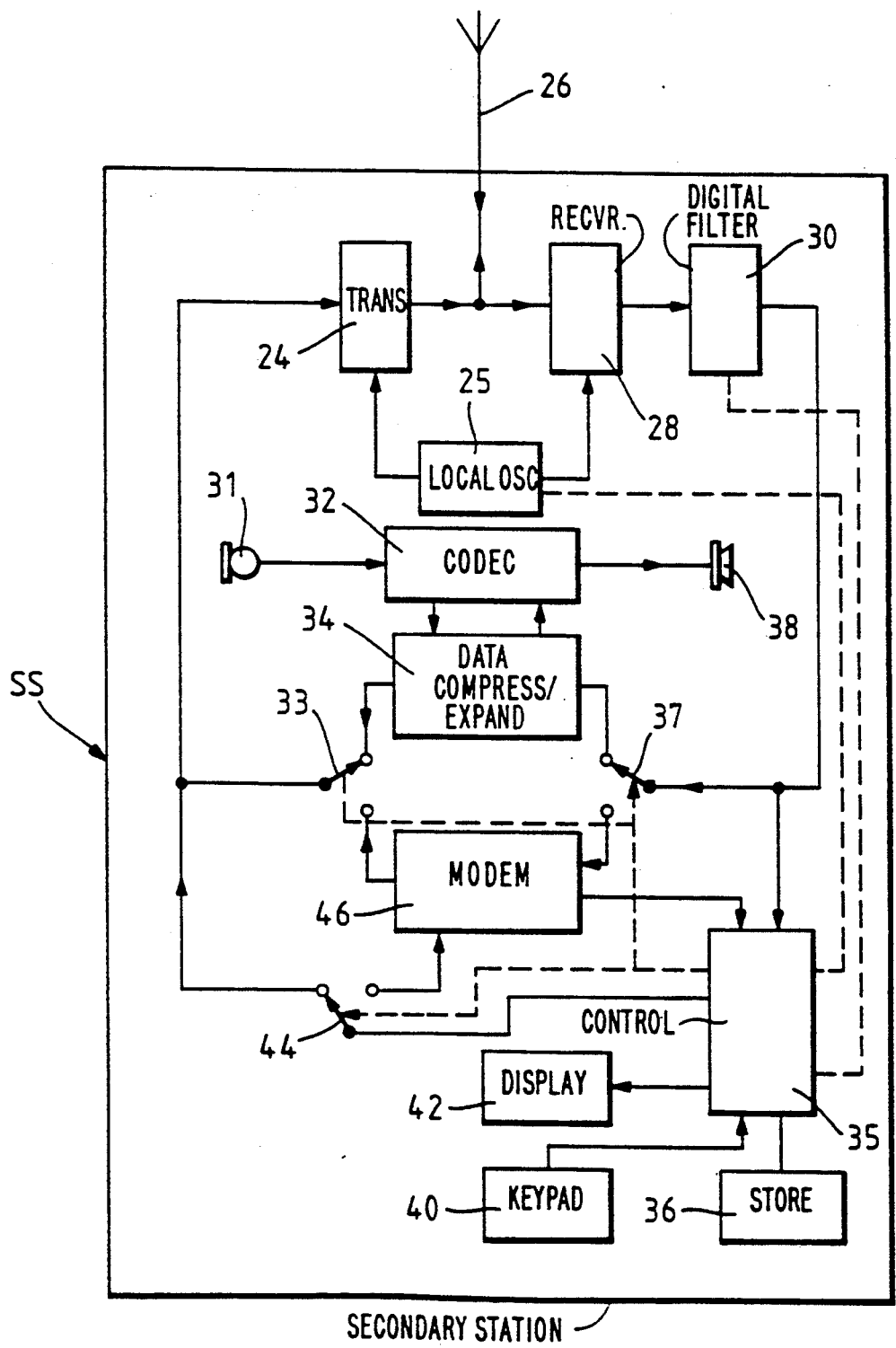
FIG. 6 is a block schematic diagram of a secondary station.

FIG. 6 is a block schematic diagram of a secondary station SS suitable for use in the method and system in accordance with the present invention. The secondary station SS comprises a transmitter 24 connected to an antenna 26 which is also connected to a receiver 28. A digital filter 30 is included in the received signal circuit to distinguish a digitised speech signal from other data signals.

A microphone 31 is connected to a code/decode circuit or CODEC 32 which includes a store for storage of the digitised speech. The CODEC 32 operates, for example, at 32 kbits/sec. The CODEC 32 is connected to a data compressor expander 34 which compresses the digitised speech into bursts having a data rate of 1.152 Mbits/sec. A control unit 35 is provided which controls the operation and internal organisation of the secondary station and which has a store 36 connected to it for storing amongst other things details of the usage and quality of all the duplex voice channels. At the occurrence of a reverse time slot or physical channel in the best available duplex voice channel, as decided by the control unit 35, a burst of compressed digitised speech is then relayed by way of a change-over switch 33 to the transmitter 34 whose carrier channel has been set by the control unit 35 applying control signals to a local oscillator 25 as part of the choice of the best available duplex voice channel.

The received digitised speech in the forward time slot or physical channel is relayed by way of a change-over switch 37 to the data compressor/expander 34 in which it is expanded to digitised speech having a data rate of 32 kbits/sec., passed for decoding to the CODEC 32 and then to a loudspeaker or other audio transducer 38.

A keypad 40 is connected to the control unit 35, for keying-in data such as a called party's telephone number. The control element 35 causes the keyed-in data to be displayed on a display device 42. The control unit 35 also adds the necessary signalling to the keyed-in data, which is conveyed by way of a change-over switch 44 to the transmitter 24.

The switches 33, 37 and 44 are controlled by the control unit 35.

Assuming that the secondary station is operating in a normal idle beacon mode, at least its transmitter 24 and receiver 28 are powered down. At least the receiver is awakened by instructions generated by the control unit 35 to listen for paging signals for up to 417 $\mu$S every 160 mS.

However if the secondary is not locked to a carrier channel it will scan all the carrier channels in accordance with the method described with reference to FIGS. 4 and 5. Any signals and information found in the scans are detected by the digital filter 30, which is turn signals the presence of data signals to the control unit 35, which in response thereto changes over the switches 33, 37 and 44. The signal and/or information is decoded in a MODEM 46, and the message information is supplied to the control unit 35.

If a secondary station SS wishes to "converse" with the primary station in response to the received invitation signal, the control unit 35 causes a suitable response message to be generated and be sent to the MODEM 46 by way of the switch 44. The modulated output from the MODEM 46 is supplied to the transmitter 24 by way of the switch 33. The transmitter 24 transmits the response on the reverse physical channel of the duplex voice channel used by the primary station when sending the invitation message.

The remainder of the message exchange takes place under the direction of the control unit 35 which has been preprogrammed to carry out the sequence of operations mentioned above.

The structure and operation of a primary station generally resembles that of the secondary station shown in FIG. 6. However, because the primary station is essentially a relay station interconnecting the PSTN to the secondary station by way of an air interface, it does not require a microphone, loudspeaker and keypad. Further a primary station normally transmits on at least one physical channel per frame and receives on multiple physical channels per frame.

Figure 7:
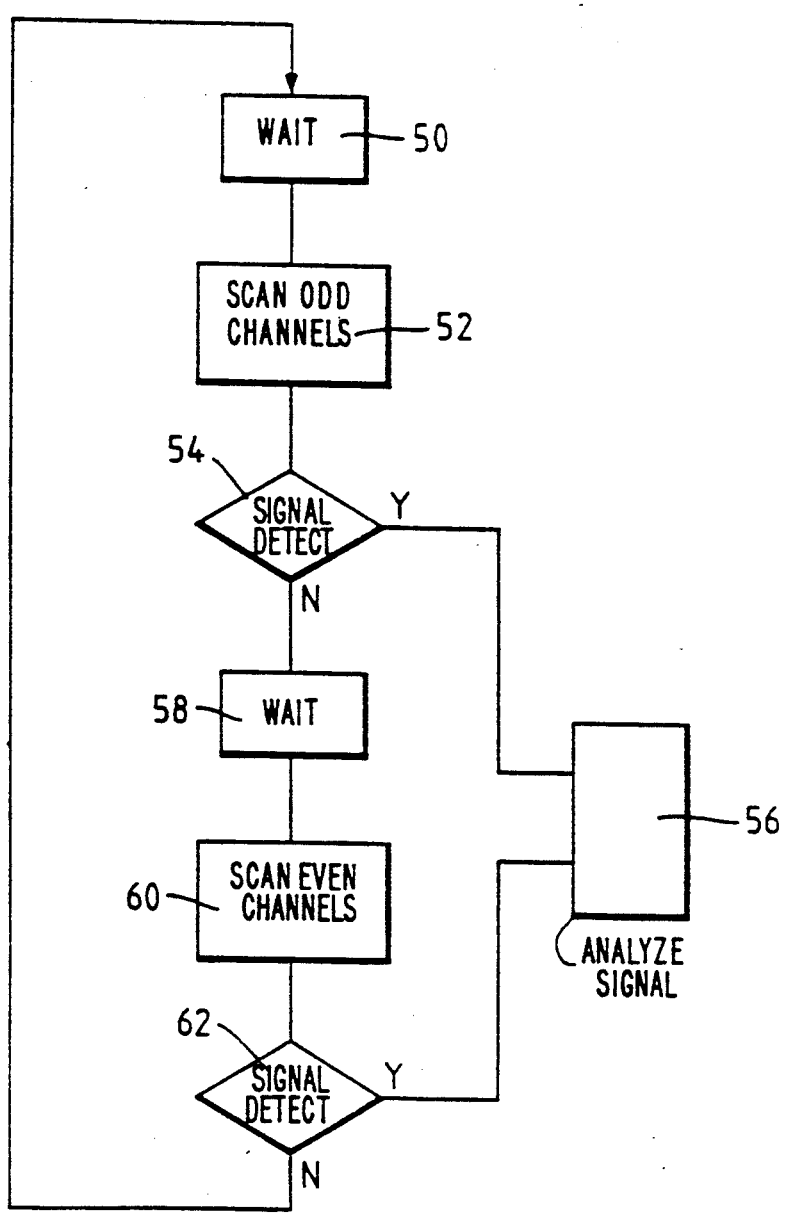
FIG. 7 is a flow chart illustrating one embodiment of the method in accordance with the present invention.

For the sake of completeness FIG. 7 illustrates a flow chart of the operations carried out by the control unit of an idle secondary station when scanning non-adjacent carrier channels. In the interests of brevity the scanning sequence will comprise the odd numbered carrier channels, a delay, and then the even numbered carrier channels. However the flow chart may readily be altered to accommodate other scanning sequences.

The flow chart starts with the block 50 which indicates the idle secondary station waiting for a predetermined time. At the expiry of the predetermined period, the scan of the odd numbered carrier channels takes place which operation is indicated by the block 52. A decision stage 54 indicates the detection or otherwise of signals in the physical channels which were scanned. Whenever an idle beacon or some other signal is detected, output Y, it is analysed as indicated by the block 56. If no signals are detected, output N, then the flow chart proceeds to a waiting stage, block 58. The described operations are then repeated except that the even numbered carrier channels are now scanned, block 60, and the detection of a signal is detected by a decision stage 62. A negative output (N) from the decision stage 62 cause the process to return to wait, namely the block 50.

By sampling the physical channels for a fraction of their duration, it is possible for the scanning sequence to comprise all the carrier channels since an improved power consumption can be achieved inasmuch as each physical channel is only monitored for about one eighth of its duration (416 $\mu$S).

In another variant of the present invention to speed up the locking of a secondary station on to its system, a secondary station can build up a list of identities of neighboring systems and their primary stations and as it approaches its home base station it recognises that it is passing through the coverage areas of the neighboring systems and can speed up its scanning of the carrier channels in anticipation of locking to its system with the minimum of delay.

In a typical situation in a residential environment, when a secondary station wanders out of range of its own primary station, it will probably search around to see if there is any other physical channel on which it can receive that primary station. During this search the primary station may receive signals from other systems. These signals contain the identities of neighboring systems, and the primary station identity. The control element of the secondary station can arrange for these system identities to be stored, and if, on one of its infrequent searches, it finds one of its neighboring systems, then it can increase its search rate in anticipation of quickly picking up its home system on the assumption that it is travelling towards its home coverage area.

For convenience of description, the present invention has been described with reference to DECT. However, the method in accordance with the present invention may be used in other suitable systems.

From reading the present disclosure, other modifications will be apparent to persons skilled in the art. Such modifications may involve other features which are already known in the design, manufacture and use of digital cordless telephone systems and devices and component parts thereof and which may be used instead of or in addition to features already described herein. Although claims have been formulated in this application to particular combinations of features, it should be understood that the scope of the disclosure of the present combination of features disclosed herein either explicitly or implicitly or any generalisation thereof, whether or not it relates to the same invention as presently claimed in any claim and whether or not it mitigates any or all of the same technical problems as does the present invention.

We claim:

1. A method of operating a cellular communications system which comprises a plurality of primary stations and a plurality of secondary stations, the respective primary stations having respective carrier channels, communication between a primary station and secondary stations being in accordance with a time division multiplex protocol such that the relevant carrier channel is divided into successive time frames each of which is further divided into successive physical channels, an idle physical channel of a carrier channel being so identified by a beacon signal transmitted therein by the relevant primary station; and wherein to select a physical channel an out-of-lock secondary station is periodically actuated to sequentially scan the physical channels of the carrier channels to detect beacon signals therein, the scanning including detection of the transmission characteristics of such carrier channels;

said method being characterized in that the periodic scanning sequence followed by an out-of-lock secondary station comprises:

(i) scanning successive physical channels of one of a selected series of non-adjacent carrier channels;

(ii) during step (i) identifying, by detecting beacon signals therein, any idle physical channels in said one carrier channel as well as in a carrier channel adjacent thereto;

(iii) consecutively repeating steps (i) and (ii) for consecutive non-adjacent carrier channels in said selected series; and (iv) ceasing further scanning after having identified an idle physical channel in a carrier channel having transmission characteristics which are acceptable to the secondary station, and locking-in to such carrier channel.

2. A cellular communications system which comprises a plurality of primary stations and a plurality of secondary stations, the respective primary stations having respective carrier channels, communication between a primary station and secondary stations being in accordance with a time division multiplex protocol such that the relevant carrier channel is divided into successive time frames each of which is further divided into successive physical channels, an idle physical channel of a carrier channel being so identified by a beacon signal transmitted therein by the relevant primary station; and wherein to select a physical channel an out-of-lock secondary station is periodically actuated to sequentially scan the physical channels of the carrier channels to detect beacon signals therein, the scanning including detection of the transmission characteristics of such carrier channels; characterized in that:

each secondary station comprises receiving means and control means for periodically actuating the receiving means to perform the following scanning sequence when the secondary station is out-of-lock in order to select an idle physical channel of a carrier channel with which to lock-in:

(i) scan successive physical channels of one of a selected series of non-adjacent carrier channels;

(ii) during step (i) identify, by detecting beacon signals therein, any idle physical channels in said one carrier channel as well as in a carrier channel adjacent thereto;

(iii) consecutively repeat steps (i) and (ii) for consecutive non-adjacent carrier channels in said selected series; and (iv) cease further scanning after having identified an idle physical channel in a carrier channel having transmission characteristics which are acceptable to the secondary station, and lock-in to such carrier channel.

3. A secondary station for use in a cellular communications system which comprises a plurality of primary stations and a plurality of said secondary stations, the respective primary stations having respective carrier channels, communication between a primary station and secondary stations being in accordance with a time division multiplex protocol such that the relevant carrier channel is divided into successive time frames each of which is further divided into successive physical channels, an idle physical channel of a carrier channel being so identified by a beacon signal transmitted therein by the relevant primary station; characterized in that each said secondary station comprises:

receiving means and control means for periodically actuating the receiving means to perform the following scanning sequence when the secondary station is out-of-lock in order to select an idle physical channel of a carrier channel with which to lock-in:

(i) scan successive physical channels of one of a selected series of non-adjacent carrier channels;

(ii) during step (i) detect beacon signals which identify any idle physical channels in said one carrier channel as well as in a carrier channel adjacent thereto, and evaluate the transmission characteristics of such carrier channels;

(iii) consecutively repeat steps (i) and (ii) for consecutive non-adjacent carrier channels in said selected series; and (iv) cease further scanning after having identified an idle physical channel in a carrier channel having acceptable transmission characteristics, and lock-in to such carrier channel.

4. A secondary station as claimed in claim 3 wherein each primary station has a respective coverage area, the beacon signal transmitted by each primary station includes a system identification code, and the secondary station has a home primary station; characterized in that said secondary station further comprises means for storing the system identification codes of the home primary station and of primary stations having coverage areas neighboring that of the home primary station; and said control means is adapted to increase the rate of scanning of physical channels of non-adjacent carrier channels when the system identification codes of the beacon signals detected by the secondary station signify that the secondary station is passing through neighboring coverage areas in a direction toward the coverage area of said home primary station.

5. A secondary station as claimed in claim 3, wherein scanning of successive physical channels of a carrier channel comprises all physical channels in a frame of such carrier channel.

6. A secondary station as claimed in claim 3, wherein the physical channels of a carrier channel comprise a series of consecutive forward physical channels and a series of consecutive reverse physical channels, and scanning of successive physical channels of a carrier channel comprises only the physical channels in one of said two series.

7. A secondary station as claimed in claim 3, wherein scanning of a physical channel includes monitoring thereof all during such scanning in order to detect any signals present therein.

8. A secondary station as claimed in claim 3, wherein scanning of a physical channel includes monitoring thereof during only a fraction of the scanning period in order to detect the strength of any signals present therein.

* * * * *